(12) United States Patent
Kipling et al.

(10) Patent No.: US 9,693,541 B2
(45) Date of Patent: Jul. 4, 2017

(54) FISHING POLE SYSTEM AND METHOD OF USE

(71) Applicant: Mudbum, L.L.C., Des Moines, IA (US)

(72) Inventors: Jeff Kipling, Des Moines, IA (US); William Blaine Garrett, II, Des Moines, IA (US)

(73) Assignee: Mudbum, L.L.C., Des Moines, IA (US)

( * ) Notice: Subject to any disclaimer, the term of this patent is extended or adjusted under 35 U.S.C. 154(b) by 282 days.

(21) Appl. No.: 14/451,509

(22) Filed: Aug. 5, 2014

(65) Prior Publication Data

US 2015/0040461 A1  Feb. 12, 2015

Related U.S. Application Data

(60) Provisional application No. 61/863,035, filed on Aug. 7, 2013.

(51) Int. Cl.
*A01K 87/00* (2006.01)

(52) U.S. Cl.
CPC ................ *A01K 87/002* (2013.01)

(58) Field of Classification Search
CPC ....... A01K 97/10; A01K 87/00; A01K 87/002
USPC ............. 43/4.5, 21.2, 54.1, 18.1 R, 19.2, 23, 43/44.87, 44.9, 6
See application file for complete search history.

(56) References Cited

U.S. PATENT DOCUMENTS

| | | | | |
|---|---|---|---|---|
| 796,342 | A * | 8/1905 | Kunziger | A01K 87/04 43/24 |
| 4,121,369 | A * | 10/1978 | Lopez | A01K 87/002 43/18.1 R |
| 7,730,660 | B2 * | 6/2010 | Matheny | A01K 89/08 43/15 |
| 2006/0101705 | A1 * | 5/2006 | Sanders | A01K 87/00 43/25 |

OTHER PUBLICATIONS http://catfish-getters.com/catfishgettersstore.html; Nov. 3, 2014.

* cited by examiner

*Primary Examiner* — Kathleen Alker
*Assistant Examiner* — Jeffrey R Larsen
(74) *Attorney, Agent, or Firm* — Christopher A. Proskey; BrownWinick Law Firm (57) ABSTRACT

A fishing pole system includes a shaft having a hollow interior with a cap connected to its upper end and a point connected to its lower end. A slide is positioned within the hollow interior and an internal lead is connected to the slide at its lower end, the internal lead extends through the cap and connects to a swivel at its upper end. The slide includes a locking mechanism which engages a locking mechanism connected to the point. In use, the cap end of the fishing pole is banged on the ground which releases the slide from the point and the internal lead is paid-out from the hollow interior. To store the fishing pole, the slide is withdrawn within the hollow interior by gravity. When fully withdrawn, the point is banged into the ground causing the slide to lock to the point and the fishing pole is stored away.

20 Claims, 7 Drawing Sheets

FISHING POLE SYSTEM AND METHOD OF USE

CROSS REFERENCE TO RELATED APPLICATION

This application claims the benefit of U.S. Provisional Application No. 61/863,035 filed Aug. 7, 2013.

FIELD OF THE INVENTION

This invention relates to a fishing pole. More specifically, and without limitation, this invention relates to a fishing pole system for catching catfish.

BACKGROUND OF THE INVENTION

Fishing with various devices is old and well known. One form of fishing, which is especially use in rivers, is known as ditty pole fishing. Conventionally, a ditty pole is formed of a shaft that is formed of any type of material such as wood, iron, plastic or the like is pounded into a river bank. A line with a hook and a weight is connected to an upper end of the shaft, and the lower end of the shaft is pounded into the shoreline or riverbank such that the hook dangles in the water.

One problem with this arrangement is that the lines with hooks and weights are inconvenient and dangerous, especially when several ditty poles are carried or used on a boat at the same time. That is, because the line is exterior to the pole, and there is no way to effectively secure the line to the pole and therefore the lines have a tendency to come loose. A loose weight and hook create a dangerous condition. In addition, when several ditty poles are carried at the same time or stacked together, the loose lines, hooks and weights have a tendency to tangle with one another. This forces the user to take time to untangle the lines which can be extremely frustrating and time consuming. In the event that the lines cannot be untangled, which often occurs, this causes the user to cut the lines and install new tackle, which is also time consuming as well as costly, or alternatively, this causes the user to cut the lines and install new tackle Therefore, in view of the disadvantages in the prior art, for the reasons stated above, and for other reasons stated below which will become apparent to those skilled in the art upon reading and understanding the specification, there is a need in the art for an fishing pole system Thus, it is a primary object of the invention to provide a fishing pole system that improves upon the state of the art.

Another object of the invention is to provide a fishing pole system that is convenient to use.

Yet another object of the invention is to provide a fishing pole system that is safe to use.

Another object of the invention is to provide a fishing pole system that prevents or eliminates tangles.

Yet another object of the invention is to provide a fishing pole system that can be quickly put to use.

Another object of the invention is to provide a fishing pole system that can be quickly taken down.

Yet another object of the invention is to provide a fishing pole system that stores line within the fishing pole.

Another object of the invention is to provide a fishing pole system that is relatively inexpensive.

Yet another object of the invention is to provide a fishing pole system that provides all the needed components in a convenient and easy to use package.

Another object of the invention is to provide a fishing pole system that makes it easier to use multiple poles.

Yet another object of the invention is to provide a fishing pole system that locks the line within the fishing pole.

Another object of the invention is to provide a fishing pole system that allows the line to withdrawn from within the fishing pole on command.

Yet another object of the invention is to provide a fishing pole system that is durable.

Another object of the invention is to provide a fishing pole system that has a long useful life.

Yet another object of the invention is to provide a fishing pole system that can be easily disassembled and reassembled.

Another object of the invention is to provide a fishing pole system that has a refined look, feel and operation.

Yet another object of the invention is to provide a fishing pole system that can handle the largest fish.

Another object of the invention is to provide a fishing pole system that does not require tying any knots to use the system.

These and other objects, features, or advantages of the invention will become apparent from the specification, claims and drawings.

SUMMARY OF THE INVENTION

A fishing pole system includes a shaft having a hollow interior with a cap connected to its upper end and a point connected to its lower end. A slide is positioned within the hollow interior and an internal lead is connected to the slide at its lower end, the internal lead extends through the cap and connects to a swivel at its upper end. The slide includes a locking mechanism which engages a locking mechanism connected to the point. In use, the cap end of the fishing pole is banged on the ground which releases the slide from the point and the internal lead is paid-out from the hollow interior. To store the fishing pole, the slide is withdrawn within the hollow interior by gravity. When fully withdrawn, the point is banged into the ground causing the slide to lock to the point and the fishing pole is stored away.

BRIEF DESCRIPTION OF THE DRAWINGS

FIG. 5 is an exploded side cut-away elevation view of a fishing pole shown in FIG. 2, the view showing, the cap unthreaded from the upper end of the fishing pole and the slide positioned within the bore of the shaft, the view also showing the internal lead connected at its lower end to the eyelet of the slide, extending through the bore of the cap and connected at its upper end to a swivel, the view also showing a hook led connected to the swivel, the view showing the point unthreaded from the lower end of the fishing pole and the slide removed from within the bore of the shaft, the view also showing the upper locking mechanism connected to the lower end of the slide, and the lower locking mechanism connected to the upper end of the point, the view showing the bore within the slide and the bore and shoulder within the cap.

DETAILED DESCRIPTION OF THE PREFERRED EMBODIMENT

Figure 1:
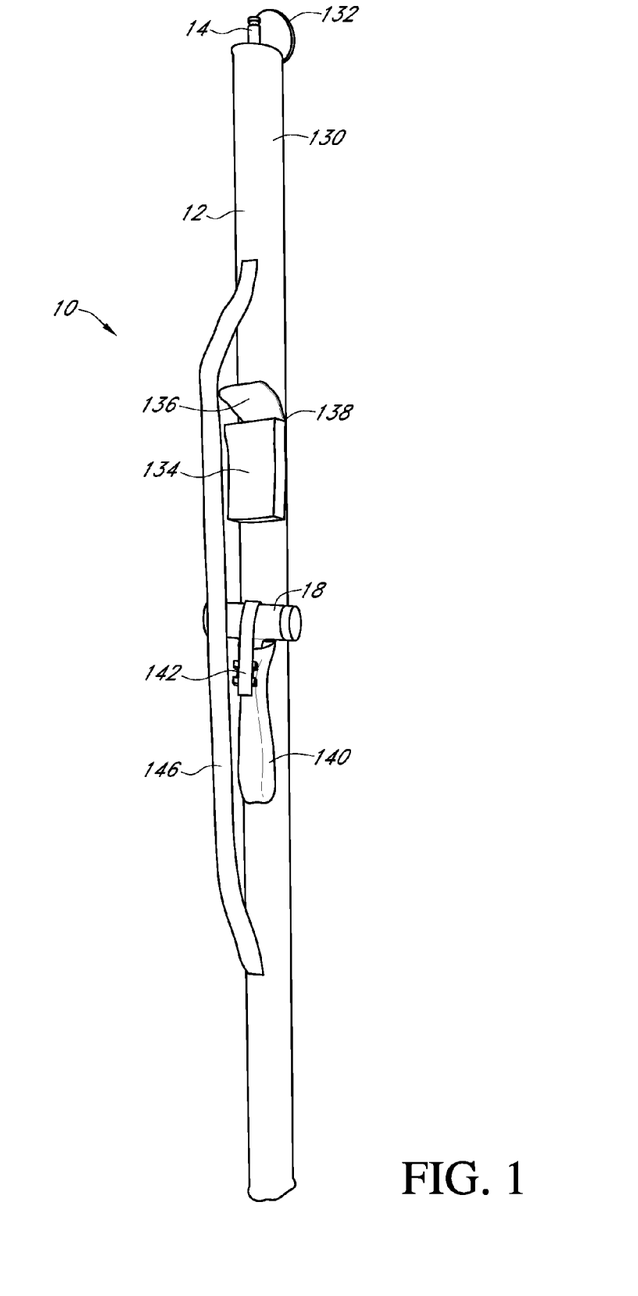
FIG. 1 is a perspective view of the fishing pole system held within a carrying case, the view showing the main compartment holding a plurality of fishing poles, a tackle box held within a tackle compartment, a hammer positioned within the hammer compartment and a shoulder strap.
Figure 2:
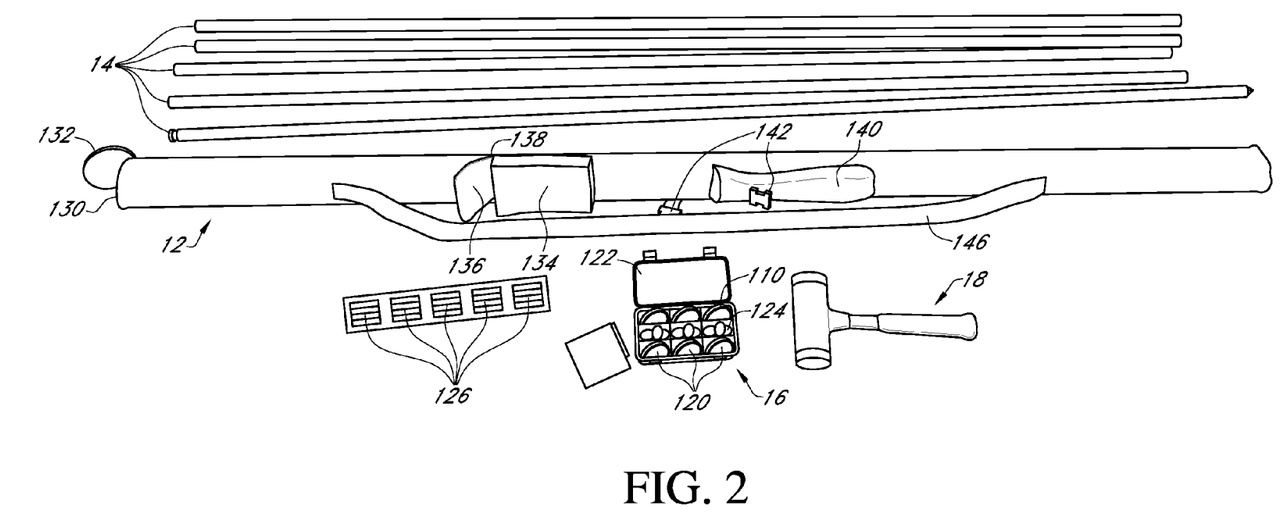
FIG. 2 is a perspective view of the fishing pole system of FIG. 1, the view showing the plurality of fishing poles removed from the main compartment of the carrying case, the tackle box removed from the tackle compartment, and the hammer removed from the hammer compartment.
Figure 3:
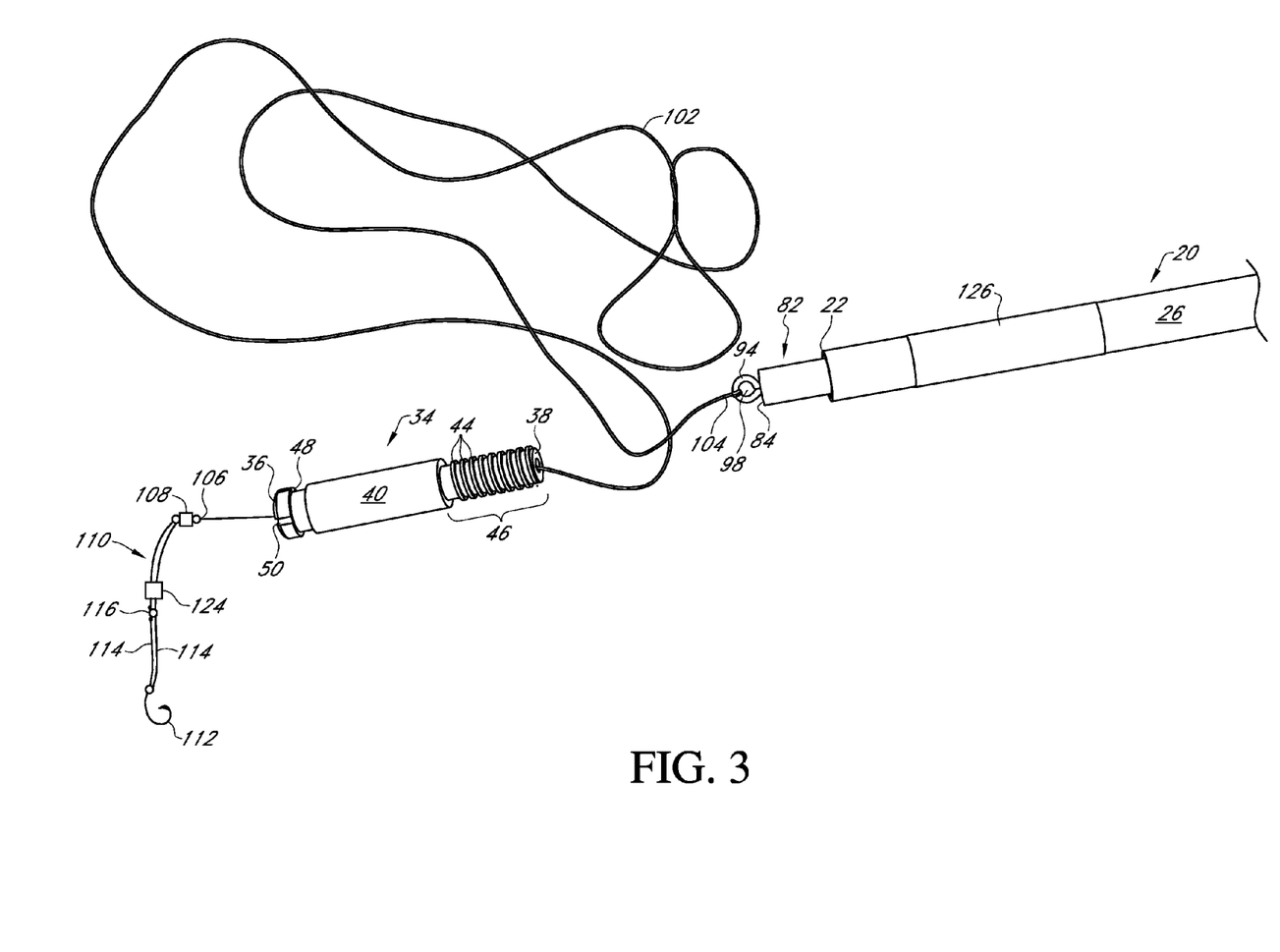
FIG. 3 is a close-up perspective view of the upper end of a fishing pole shown in FIG. 2, the view showing the cap unthreaded from the upper end of the fishing pole and the slide extending partially within the bore of the shaft, the view also showing the internal lead connected at its lower end to the eyelet of the slide, extending through the bore of the cap and connected at its upper end to a swivel, the view also showing a hook led connected to the swivel.
Figure 4:
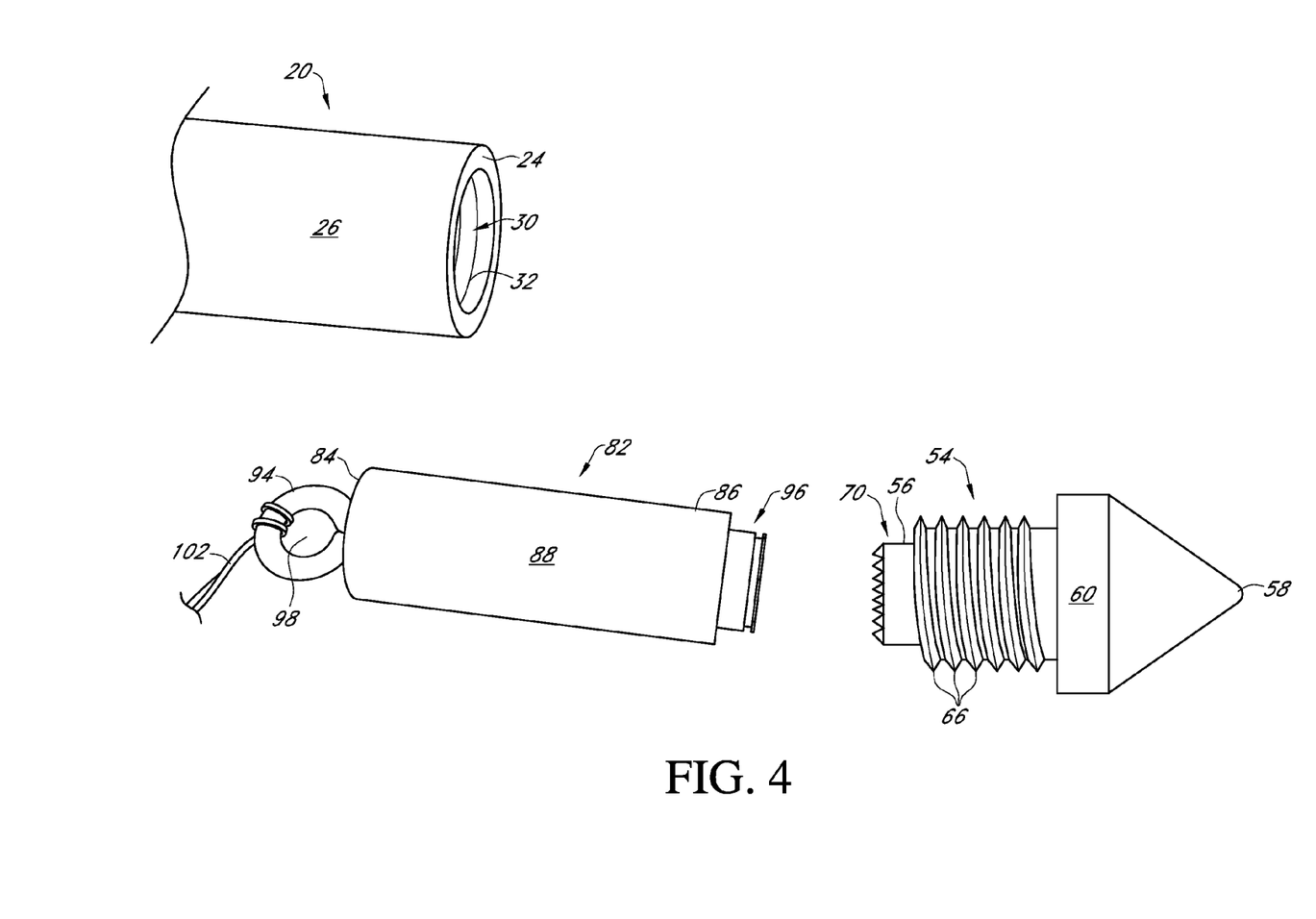
FIG. 4 is a close-up perspective view of the lower end of a fishing pole shown in FIG. 2, the view showing the point unthreaded from the lower end of the fishing pole and the slide removed from within the bore of the shaft, the view also showing the internal lead connected at its lower end to the eyelet of the slide, the view also showing the upper locking mechanism connected to the lower end of the slide, and the lower locking mechanism connected to the upper end of the point.
Figure 5:
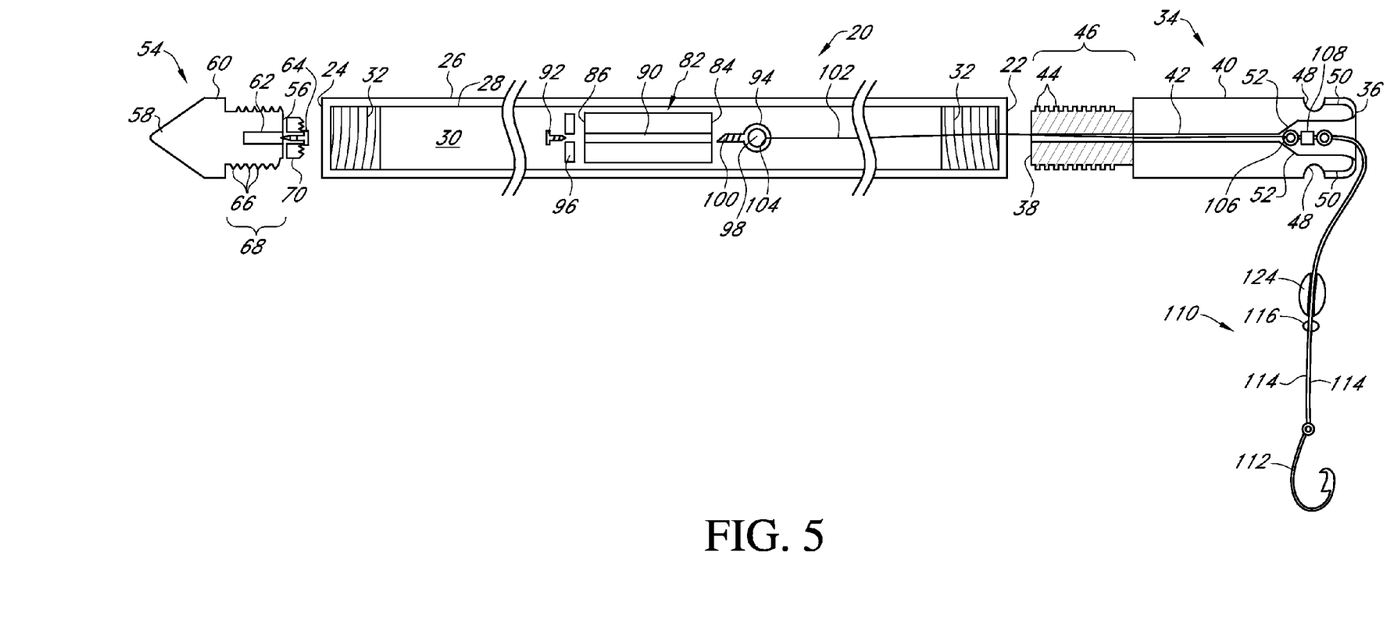
Figure 6:
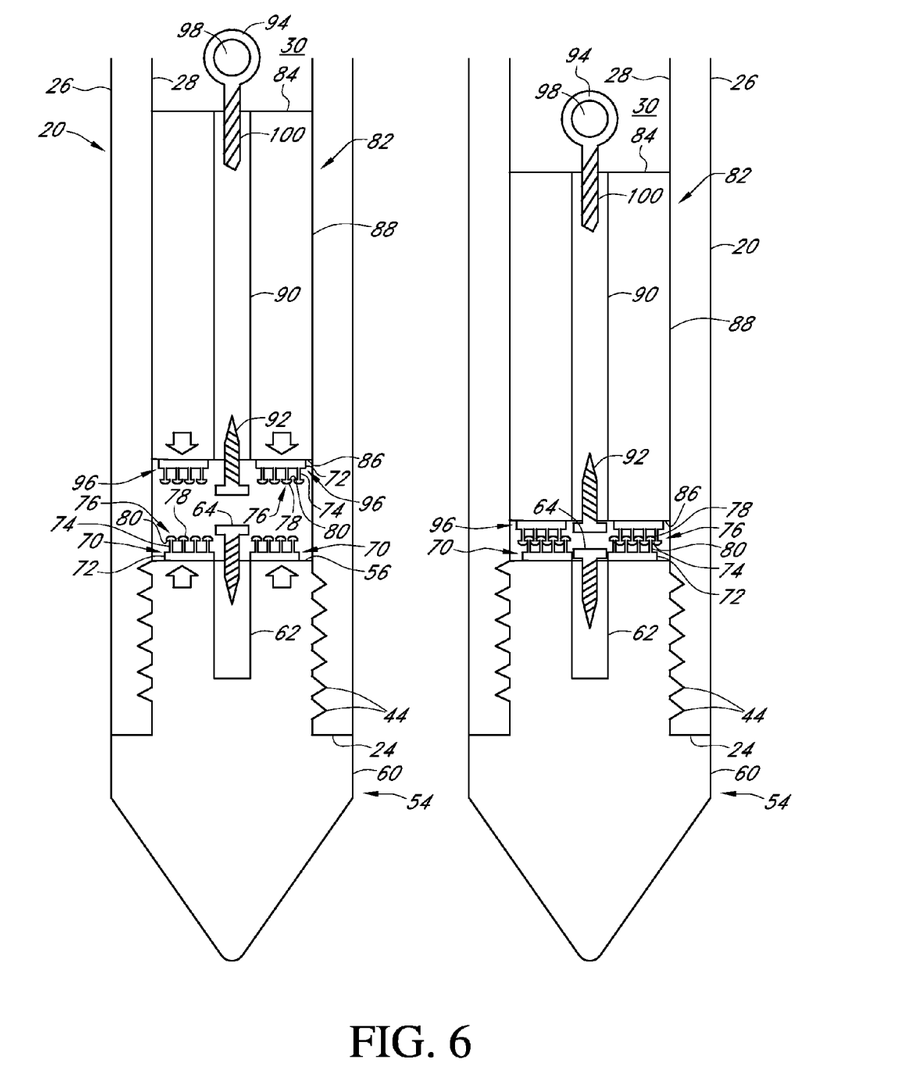
FIG. 6 is side cut away view of a pair of fishing poles shown in FIG. 2, the view showing the fishing pole on the left with locking mechanism connected to the slide in a disengaged position with the locking mechanism on the point; the view showing the fishing pole on the right with locking mechanism connected to the slide in an engaged position with the locking mechanism on the point.
Figure 7:
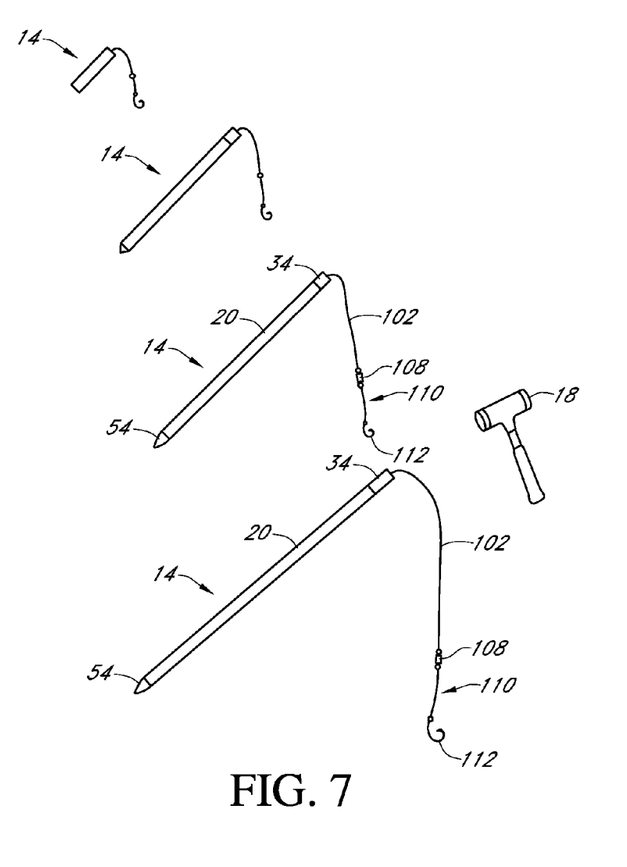
FIG. 7 is a perspective view of a plurality of fishing poles shown in FIG. 2 in use.

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that mechanical, procedural, and other changes may be made without departing from the spirit and scope of the invention. The following detailed description is, therefore, not to be taken in a limiting sense, and the scope of the invention is defined only by the appended claims, along with the full scope of equivalents to which such claims are entitled.

As used herein, the terminology such as vertical, horizontal, top, bottom, front, back, end, sides, and the like, are referenced according to the views presented. It should be understood, however, that the terms are used only for purposes of description, and are not intended to be used as limitations. Accordingly, orientation of an object or a combination of objects may change without departing from the scope of the invention.

With reference to the figures an improved fishing pole system 10 is presented. The fishing pole system 10 includes a carrying case 12 that holds a plurality of fishing poles 14, at least one tackle box 16 and a hammer 18.

Fishing Pole:

The fishing poles 14 are formed of any suitable size, shape and design. In the arrangement shown, fishing poles include a shaft 20 that extends a length between an upper end 22 and a lower end 24. The shaft 20 has an exterior surface 26 and an opposing interior surface 28 that defines a hollow interior 30. In the arrangement shown, shaft 20 is generally cylindrical in shape and has a generally constant cross section along its length from upper end 22 to lower end 24. Threads 32 are positioned adjacent the upper end 22 and lower end 24 of shaft 20. While these threads 32 are shown as being positioned in the interior surface 28 of shaft 20, it is hereby contemplated that threads 32 may alternatively be placed in the exterior surface 26 of shaft 20.

In one arrangement, the shaft 20 is formed of a resilient composite or plastic material that is rigid yet flexible. This flexibility provides some give and bending when a large fish is caught.

Cap:

A cap 34 is connected to the upper end 22 of shaft 20. Cap 34 is formed of any suitable size, shape and design. In the arrangement shown, cap 34 extends a length between an upper end 36 and a lower end 38. The cap 34 has an exterior surface 40 and a bore 42 that extends through cap 34, approximately at its center, from upper end 36 to lower end 38 thereby providing a passageway through cap 34. In the arrangement shown, cap 34 is generally cylindrical in shape along its length. Threads 44 are positioned adjacent the lower end 38 of cap 34 in a stepped portion 46 or narrower portion of cap 34. While these threads 44 are shown as being positioned in the exterior surface 40 of cap 34, it is hereby contemplated that threads 32 may alternatively be placed in an exterior surface of cap 34. This stepped portion 46 is sized and shaped to fit within the hollow interior 30 of shaft 20 and threads 44 are sized and shaped to threadably engage threads 32 of shaft 20 thereby removably locking the two components 20, 34 together.

A groove 48 is positioned in the exterior surface 40 of cap 34 and positioned a small distance inward from upper end 36. Groove 48 extends around the entire diameter of cap 34. Groove 48 is slightly recessed from the exterior surface 40 of cap 34. A plurality of recessed pathways 50 connect groove 40 to bore 42. That is, these pathways 50 are recessed grooves themselves that extend from bore 42, around the end 36 of cap 34 and connect to groove 48. In the arrangement shown, pathways 50 connect to groove 48 in a generally perpendicular orientation to one another. In the arrangement shown, four pathways 50 are positioned in the end 36 of cap 34, each pathway 50 positioned approximately 90° to one another. However, any other number of pathways 50 are hereby contemplated for use, such as one, two, three, five, six, or more. These pathways 50 and their connection to groove 48 provide a place hold line and adjust its length as is further described herein.

Bore 42 includes a shoulder 52 positioned between upper end 36 and lower end 38. Shoulder 52 transitions the diameter of bore 42 from a smaller or narrower diameter adjacent lower end 38 to a larger or wider diameter adjacent upper end 36. In the arrangement shown, shoulder 52 smoothly angles from the wider diameter to the narrower diameter to provide a smooth transition, however a perpendicular step is also hereby contemplated for use. The wider diameter of bore 42 is used to catch, hold and store a swivel, as is further described herein whereas the narrower diameter is used allow only the passage of an internal lead, as is also further described herein.

Point:

A point 54 is connected to the lower end 24 of shaft 20. Point 54 is formed of any suitable size, shape and design. While the term "point" is used herein, the term "point" is not limited to being pointed or having a point, instead the term "point" as used herein has a broader meaning that means a part, piece, or device that is positioned at the end of shaft 20.

In the arrangement shown, point 54 extends a length between an upper end 56 and a lower end 58 or tip. The point 54 has an exterior surface 60 and a bore 62 that extends through point 54, approximately at its center, from upper end 56 a distance towards lower end 58 thereby providing a mounting place for fastener 64, such as a screw, bolt, snap-fit member, or the like, in point 54 without the need for drilling a hole. In the arrangement shown, point 54 is generally cylindrical exterior surface before terminating in an angled point adjacent its lower end 58. Threads 66 are positioned adjacent the upper end 56 of point 54 in a stepped portion 68 or narrower portion of point 54. While these threads 66 are shown as being positioned in the exterior surface 60 of point 54, it is hereby contemplated that threads 66 may alternatively be placed in an interior surface of point 54. This stepped portion 68 is sized and shaped to fit within the hollow interior 30 of shaft 20 and threads 66 are sized and shaped to threadably engage threads 32 of shaft 20 thereby removably locking the two components 20, 54 together.

A lower locking mechanism 70 is connected to the upper end 56 of point 54. Lower locking mechanism 70 is any form of a device that removably connects two components together, either individually or in combination with other parts, pieces or components. In the arrangement shown, the upper end 56 of point 54 is generally flat and perpendicular to the length of shaft 20. In this arrangement, lower locking mechanism 70 is connected to the upper end 56 of point 54 in a flat and flush arrangement. As is shown in this arrangement, lower locking mechanism 70 is formed in the shape of a washer or circle with an opening at its center. When lower locking mechanism 70 is connected to the upper end 56 of point 54, the opening in lower locking mechanism 70 aligns with bore 62 in point 54. Once in this position, fastener 64 is passed through the opening in lower locking mechanism 70 and into bore 62 thereby frictionally holding the two components 54, 70 together. To improve strength of hold, the lower locking mechanism 70 is also adhered to the upper end 56 of point 54. However, the two components 54, 70 can be connected by any other means, such as adhering, gluing, welding, forming the two components out of a single piece of material, snap-fitting them together, screwing them together, or the like.

In the arrangement shown, lower locking mechanism 70 is one half of what is known as a "Dual Lock™" mechanism, which is manufactured by 3M, having an address at 3M Center, St. Paul, Minn. 55144-1000, among other manufacturers. 3M's Dual Lock mechanism is formed of two opposing sides, each side having a rigid or flexible backing 72 to which a plurality of posts 74 extend upwardly therefrom a length. A head 76 is positioned at the end of each of these posts 74, the heads 76 have an angled, curved or pointed top surface 78 that extends downward until terminating in a flat or square bottom surface 80 that extends in a generally perpendicular plane to the length of posts 74, or in a generally parallel plane to the plane formed by backing 72.

In this arrangement, when two opposing locking mechanisms are forced into engagement with one another, the top surface 78 of the opposing heads 76 engage one another. When engaged, because heads 76 are angled, curved or sloped toward the bottom surface 80 the opposing heads 76 deflect or slide over one another. This deflection causes the heads 76 to slide down and past one another as the posts 74 slightly bend or deflect themselves. This continues until the lip of bottom surfaces 80 of opposing heads 76 pass one another at which point the posts 74 snap back into generally perpendicular alignment with backing 72. An audible snapping noise is often heard when the two opposing locking mechanisms lock onto one another. In this arrangement the flat bottom surfaces 80 of opposing locking mechanisms are in flush, flat and frictional locking arrangement with one another, thereby holding the two components together.

Because the bottom surfaces 80 of engaged heads 76 are flat and in flush engagement with one another, without the application of substantial external force, the two components remain in locked engagement with one another.

To disengage two locking components, substantial external force is applied. This pulling force causes the posts 74 to deflect and allows the heads 76 to again slide past one another.

This process is repeated over and over to engage and disengage the two components of the Dual Lock system. Compared to conventional Velcro®, also manufactured by 3M, or other Hook & Loop fasteners, the tensile strength of Dual Lock fasteners is greater with up to five times more holding power. In addition, a Dual Lock system is particularly well suited for connecting two components that engage one another in a flat and flush manner, as is shown in the pictured arrangement.

Slide:

A slide 82 is positioned within the hollow interior 30 of shaft 20. Slide 82 is formed of any suitable size, shape and design. In the arrangement shown, slide 82 extends a length between an upper end 84 and a lower end 86. Slide 82 an exterior surface 88 and a bore 90 that extends through slide 82, from upper end 84 to lower end 86, approximately at its center, thereby providing a mounting place for fastener 92, such as a screw, bolt, snap-fit member, or the like, in its lower end 86 and an eyelet 94 in its upper end 84 without the need for drilling a hole in slide 82.

In the arrangement shown, the exterior surface 88 of slide 82 is generally cylindrical in shape. The exterior surface 88 of slide 82 is sized and shaped to fit within the hollow interior 30 of shaft 20 with close tolerances. These close tolerances allow slide 82 to slide though the length of hollow interior 30 while still maintaining proper alignment within hollow interior 30.

An upper locking mechanism 96 is connected to the lower end 56 of slide 82. Upper locking mechanism 96 is any form of a device that removably connects two components together, either individually or in combination with other parts, pieces or components.

In one arrangement, as is shown, when lower locking mechanism 70 is one half of a Dual Lock mechanism, upper locking mechanism 96 is formed of an opposing Dual Lock mechanism. In the arrangement shown, the lower end 86 of slide 82 is generally flat and perpendicular to the length of shaft 20. In this arrangement, upper locking mechanism 96 is connected to the lower end 86 of slide 82 in a flat and flush arrangement. As is shown in this arrangement, upper locking mechanism 96 is formed in the shape of a washer or circle with an opening at its center. When upper locking mechanism 96 is connected to the lower end 86 of slide 82, the opening in upper locking mechanism 96 aligns with bore 90 in slide 82. Once in this position, fastener 92 is passed through the opening in upper locking mechanism 96 and into bore 90 thereby frictionally holding the two components 82, 96 together. To improve strength of hold, the upper locking mechanism 96 is also adhered to the lower end 86 of slide 82. However, the two components 82, 96 can be connected by any other means, such as adhering, gluing, welding, forming the two components out of a single piece of material, snap-fitting them together, screwing them together, or the like.

Eyelet 94 is part of or connected to the upper end 84 of slide 82. In the arrangement shown, eyelet 94 has a generally circular opening 98 connected to a threaded shaft 100. The threaded shaft 100 is screwed into the bore 90 of slide 82, however any other form of connecting the two components together is contemplated.

In one arrangement, slide 82 is formed of a solid piece of material, other than bore 90. This gives slide 82 a substantial amount of weight and mass which is helps with engagement and disengagement of the locking mechanisms.

Internal Lead:

An internal lead 102 is positioned within the hollow interior of shaft 20. Internal lead 102 extends a length between a lower end 104 and an upper end 106. Internal lead 102 is formed of any flexible device such as string, twine, braid, monofilament, or the like.

In one arrangement, as is shown, internal lead is formed of a heavy duty braided fishing line. One form of a braded fishing line which has been tested with success is made of ultra-high-molecular-weight polyethylene (UHMWPE, UHMW) which is a subset of the thermoplastic polyethylene. Also known as high-modulus polyethylene, (HMPE), or high-performance polyethylene (HPPE), it has extremely long chains, with a molecular mass usually between 2 and 6 million u. The longer chain serves to transfer load more effectively to the polymer backbone by strengthening intermolecular interactions. This results in a very tough material, with the highest impact strength of any thermoplastic presently made. Various manufacturers use these UHMWPE materials to produce braided fishing line. Examples include Fireline® manufactured by Berkley Inc., Highways 9 and 71, Spirit Lake Iowa 51360; SpiderWire® manufactured by Pure Fishing, Inc., 18th Street Spirit Lake Iowa 51360; and Power Pro® manufactured by Shimano American Corporation One Holland Irvine, Calif. 92618, among countless others.

Alternatively, any other form of string or fishing line is hereby contemplated for use as internal lead 102.

In one arrangement, to provide superior durability and long life, internal lead 102 is formed of line that is rated at 100 pound capacity, 150 pound capacity, 200 pound capacity, 250 pound capacity, 300 pound capacity or more.

Internal lead 102 connects at its lower end 104 to eyelet 94 and at its upper end swivel 108. Swivel 108 is any form of a device that has an opening therein, such as a ring, swivel, barrel swivel, snap swivel, or the like, that is rigid and has a diameter or size greater than the narrow portion of bore 42 in cap 34 so as to prevent being retracted within the hollow interior 30 of shaft 20. In the arrangement shown, swivel 108 is a heavy duty barrel swivel having a pair of opposing loops connected by a barrel at its middle, the barrel allowing the opposing loops to rotate with respect to one another thereby preventing twists in the line.

When connecting internal lead 102 to eyelet 94 and swivel 108 care is taken to ensure that the length of internal lead 102 is long enough to allow the lower end 86 of slide 82 to engage the upper end 56 of point 54 at or just before swivel 108 engages shoulder 52 of cap 34. If the length of internal lead 102 is too short, swivel 108 will engage shoulder 52 before the slide can engage point 54 and lock it in place. In contrast, if the length of internal lead 102 is too long, swivel 108 will hang out of the upper end 36 of cap 34. As such, care is taken to properly and precisely use the appropriate length of material for internal lead 102.

Hook Lead:

A hook lead 110 is connected to swivel 108. Hook lead 110 is formed of any suitable size, shape and design. In the arrangement shown, as one example, hook lead 110 is formed of the same material as internal lead 102.

In one arrangement, as is shown, hook lead 110 includes a hook 112. Any form of a hook is hereby contemplated for use, however a heavy-duty circle hook is shown for use, such as those manufactured by Eagle Claw Fishing Tackle Co. having an address of 4245 East 46th Avenue, Denver, Colo. 80216. A pair of lines extend upwardly from hook 112 thereby forming a loop. The pair of lines 114 extend through a bead 116 which is positioned a distance above hook 112 and held in place between a pair of knots in lines 114, one on either side of bead 116. The end of hook lead 110 opposite hook 112 is a loop. Using a pair of lines 114 that form a loop allows a user to connect hook lead 110 to swivel 108 without any tying of knots.

To connect hook lead 110 to swivel 108, the user inserts the top end or loop end of hook lead 110 through the opening in the swivel 108. Next, the user opens the loop and drops the hook 112 through the loop and cinches the loop onto itself. In this way the hook lead 110 is quickly, easily and strongly connected to swivel 108 without any tying of knots.

To remove the hook lead 110 from the swivel 108, the opposite process is performed, which is easy and quick, since there are no knots to untie. This allows for quick and easy removal as well as reuse of the hook lead.

Alternative Locking Mechanisms:

While a Dual Lock mechanism is discussed herein for use as the lower locking mechanism 70 and upper locking mechanism 96, this is only by way of one example of an arrangement that has been tested and used with success. However, any other form of a locking or holding arrangement is hereby contemplated for use. In one arrangement, a magnet is used for one of the lower locking mechanism 70 and upper locking mechanism 96 and another magnet or a magnetically attractable piece is used as the other of the lower locking mechanism 70 and upper locking mechanism 96. In another arrangement, Velcro® or hook and loop devices are use. In yet another arrangement a friction fit device, such as a narrower collar within hollow interior 30, is used for one of the lower locking mechanism 70 and upper locking mechanism 96 such that when the other of the lower locking mechanism 70 and upper locking mechanism 96 engages the friction fit device the two components are frictionally held together. Or any other locking arrangement can be used and is hereby contemplated for use.

Tackle Box:

The system 10 includes a Tackle box 16. Tackle box 16 is formed of any suitable size, shape and design. In the arrangement shown, tackle box 16 is generally rectangular in shape with a plurality of compartments 120 positioned therein and a closable lid 122. A plurality of weights 124 of various weight and a plurality of hook leads 110 of various length and hook size are stored within the compartments 120 of the tackle box 16. Weights 124 are formed of any design or style of weight. However, as one example, in the arrangement shown barrel weights with an internal bore there through are used. This internal bore allows the end of hook lead 110, opposite hook 112, to be passed through the weight 124 before being passed through swivel 108. This arrangement avoids the need to tie a knot in hook lead 110 to attach weight 124 there to, and allows for quick and easy removal, storage, and reuse of the weights 124.

A plurality of labels 126 are also held within the tackle box 16. Labels 126 include places for a user to write their name, address, city, state, driver license number, fishing license number, phone number and other information that may be required for use of the fishing pole 14. Labels 126 have an adhesive backing and can be adhered to fishing poles 14.

Hammer:

The system 10 includes a hammer 18. Hammer 18 is any form of a device that is used to pound fishing poles 14 into a shoreline or river bank. In the arrangement shown, hammer 18 is a 40 ounce rubber mallet having a handle extending outwardly therefrom.

Carrying Case:

The system 10 includes a carrying case 12. Carrying case 12 is formed of any suitable size, shape and design. In the arrangement shown, carrying case 12 includes a main compartment 130 that is elongated and sized and shaped to hold a plurality of fishing poles 14. Main compartment 130 is opened and closed by a lid 132 that has a zipper or any other form of an opening device therein. Because many states allow a fisherman to use five poles to fish in rivers, in one arrangement, main compartment 130 is sized and shaped to hold five, ten, fifteen, twenty or more fishing poles 14.

Carrying case 12 also includes a tackle pocket 134. Tackle pocket 134 is formed of any suitable size, shape and design. In the arrangement shown, tackle pocket 134 is connected to the exterior of main compartment 130 and sized and shaped to hold tackle box 16. In the arrangement shown, tackle pocket 134 includes a flap 136 and a closing mechanism 138 such as Velcro, hook and loops, buttons, snap-fit features or the like that help to hold the flap 136 closed so as to prevent the tackle box 16 from escaping the tackle pocket 134. While only a single tackle pocket 134 is shown, it is hereby contemplated that two or more tackle pockets 134 can be used in association with a single carrying case 12.

Carrying case 12 also includes a hammer pocket 140. Hammer pocket 140 is formed of any suitable size, shape and design. In the arrangement shown, hammer pocket 140 is connected to the exterior of main compartment 130 and sized and shaped to hold the handle of hammer 18 while the mallet end of hammer 18 protrudes therefrom. In the arrangement shown, hammer pocket 140 includes a closing mechanism 142 such as Velcro, hook and loops, buttons, snap-fit features or the like that help to hold the hammer 18 within the hammer pocket 140 and prevent the hammer 18 from escaping the hammer pocket 140.

Carrying case 12 also includes an adjustable shoulder strap 146 that allows users of various sizes adjust the length of the strap 146 and comfortably carry the carrying case 12.

In Operation:

In operation, a fishing pole 14 and the tackle box 16 and hammer 18 are removed from the carrying case 12.

The pointed end 54 of fishing pole 14 is place in the desired location of the bank or shoreline, and the hammer 18 is used to pound the cap 34 of the fishing pole 14. This forces the pointed end 54 into the bank or shoreline. The user decides how far to pound the fishing pole into the ground depending on the application.

Next, the cap 34 is unscrewed from the shaft 20. This causes the slide 82 to be pulled toward the upper end 22 of the shaft 20 which causes the upper locking mechanism 96 to be pulled away from the lower locking mechanism 70. Once the upper locking mechanism 96 and the lower locking mechanism 70 disengage one another, the main lead can be pulled out of the hollow interior 30 of shaft 20. With a few shakes of the cap 34 upside down, the swivel 108 located inside the cap 34 will drop out of the cap 34. Alternatively, the slide 82 can be disengaged from the point 54 by banging the cap end 34 of the fishing pole 14 on the ground before the point 54 is inserted in the bank. This banging similarly causes the upper locking mechanism 96 to be pulled away from the lower locking mechanism 70.

Next, as the user holds onto the swivel 108, the cap 34 is screwed back into the upper end 22 of shaft 22.

Next the user removes a hook lead 110 and weight 124 from tackle box 16. The end of the hook lead 110, opposite hook 12, is fed through the bore of weight 124 until the weight 124 rests on top of the bead 116 in the hook lead 110.

Next, the end of the hook lead 110, opposite hook 112, is fed through the swivel 108. Next, the two lines 114 are separated and the hook lead 110 is passed between these two lines and the loop is cinched tight onto the swivel 108.

Next, the depth of the hook 112 is set by wrapping the lead (102 and/or 110, 114) through a pathway 50 and around the groove 48 in cap 34 until the desired length is achieved. If the maximum depth is desired, then this step is skipped, which will provide approximately eight feet of line from the cap 34 to the hook 112.

Next the hook 112 is baited and the fishing pole 14 is left to soak. When a fish grabs the bait, the flexible nature of the shaft 20 bends and the hook is set.

Tear Down:

Undo the hook lead 110 from the swivel 108, the loop is loosened and the hook 112 and other components of the hook lead 110 are fed through the loop. This disengages the hook lead 110 from the swivel 108 without untying any knots. Note: The hook 112 makes a great tool to loosen the loop from the swivel 108.

Next, the weight 124 is slid off the hook lead 110 and placed in the appropriate compartment 120 of the tackle box 16 along with the hook lead 110.

Next, the fishing pole 14 is removed from the bank and any debris is washed off the pole.

Next, the internal lead 102 is retracted within the hollow interior by pointing the cap end 34 of the fishing pole 14 towards the sky. In his position, gravity pulls the mass of slide 82 towards point 54.

Next, the slide 82 is locked onto the point 54 by placing a finger over the bore 42 in the end of cap 34 and with one swift movement striking the point 54 on the ground. This forces the upper locking mechanism 96 in locking engagement with the lower locking mechanism 70

Next the fishing pole 14 is placed in the main compartment 130.

Additional Features:

In one arrangement, the shaft 20, cap 34 and point 54 are formed of a composite or plastic material that is non-corrosive, or does not corrode. To prevent corrosion of the metallic parts, such as fasteners 64 and 92 and eyelet 94, these components are given a 565 magni coating which provides supreme corrosion protection.

Another feature of the system is the threading used to connect cap 34 and tip 54 to shaft 20 is formed of ⅞-5 acme threads which allows for a faster installation of the components as compared to using a ⅞-5 national pipe thread. As an example, using ⅞-5 national pipe thread requires turning cap 34 21 full turns to install it whereas using ⅞-5 acme threads only requires 8 and ½ turns.

From the above discussion and the accompanying drawings and claims it will be appreciated that the improved fishing pole system presented offers many advantages over the prior art. That is, the fishing pole system presented; improves upon the state of the art; is convenient to use; is safe to use; prevents or eliminates tangles; can be quickly put to use; can be quickly taken down; it stores line within the fishing pole; is relatively inexpensive; provides all the needed components in a convenient and easy to use package; makes it easier to use multiple poles; locks the line within the fishing pole; allows the line to withdrawn from within the fishing pole on command; is durable; has a long useful; can be easily disassembled and reassembled; has a refined look, feel and operation; can handle the largest fish; does not require tying any knots to use, among countless other improvements and advantages.

It will be appreciated by those skilled in the art that other various modifications could be made to the device without parting from the spirit and scope of this invention. All such modifications and changes fall within the scope of the claims and are intended to be covered thereby. It should be understood that the examples and embodiments described herein are for illustrative purposes only and that various modifications or changes in light thereof will be suggested to persons skilled in the art and are to be included within the spirit and purview of this application.

What is claimed:

1. A fishing pole system comprising:
    a shaft extending a length between an upper end and a lower end;
    the shaft having a hollow interior;
    a cap connected to the upper end of the shaft;
    a point connected to the lower end of the shaft;
    a slide positioned within the hollow interior of the shaft;
    an internal lead connected to the slide;
    a locking mechanism operatively connected to the shaft;
    wherein the slide is configured to slide a length within the hollow interior of the shaft between a retracted position and an extended position;
    wherein when in the retracted position, the slide is positioned adjacent the lower end of the shaft; and wherein when in the extended position, the slide is positioned adjacent the upper end of the shaft;
    wherein when in the retracted position the slide is configured to engage the locking mechanism of the shaft thereby locking the slide in the retracted position.

2. The fishing pole system of claim 1 wherein the point has a pointed, rounded or angled tip and is configured to be inserted within the ground adjacent a body of water.

3. The fishing pole system of claim 1 wherein when in a retracted position the internal lead is stored within the hollow interior of the shaft.

4. The fishing pole system of claim 1 wherein when in a retracted position the slide is in engagement with the point.

5. The fishing pole system of claim 1 wherein when in a retracted position the slide is in locked engagement with the point and when in an extended position the slide is disengaged from the point.

6. The fishing pole system of claim 1 wherein when in an extended position the internal lead extends out of the hollow interior through the cap.

7. The fishing pole system of claim 1 wherein when in an extended position slide is in engagement with the cap.

8. The fishing pole system of claim 1 further comprising a locking mechanism connected to the slide, wherein the locking mechanism of the slide is configured to engaged the locking mechanism of the shaft such that the slide is locked in a retracted position.

9. The fishing pole system of claim 1 further comprising wherein the locking mechanism of the shaft is connected to the point such that when the locking mechanism is engaged the slide is locked in a retracted position in engagement with the point.

10. The fishing pole system of claim 1 further comprising a locking mechanism connected to the slide wherein the locking mechanism connected to the slide is configured to engage the locking mechanism connected to the shaft when the slide is locked in a retracted position.

11. The fishing pole system of claim 1 further comprising a swivel connected to an upper end of the internal lead, the swivel configured to prevent the upper end of the internal lead from falling into the hollow interior of the shaft.

12. The fishing pole system of claim 1 wherein the cap includes a bore having a shoulder that receives a swivel connected to an upper end of the internal lead, wherein engagement between the shoulder of the cap and the swivel prevents the upper end of the internal lead from falling into the hollow interior of the shaft.

13. The fishing pole system of claim 1 wherein the locking mechanism connected to the shaft is selected from the group consisting of a magnet arrangement, a fabric-type hook and loop mechanical fastener arrangement, a friction-fit mechanical fastener arrangement, and a dual lock mechanical fastener arrangement.

14. The fishing pole system of claim 1 wherein the point is threadably engaged to the shaft.

15. The fishing pole system of claim 1 wherein the cap is threadably engaged to the shaft.

16. A method of using a fishing pole system, comprising the steps of:
    providing a fishing pole having a shaft extending a length between an upper end and a lower end and having a hollow interior;
    positioning a slide within the hollow interior of the shaft wherein the slide is configured to slide a length within the hollow interior of the shaft between a retracted position and an extended position, wherein when in the retracted position, the slide is positioned adjacent the lower end of the shaft, wherein when in the extended position, the slide is positioned adjacent the upper end of the shaft;
    providing an internal lead extending a length from a lower end to an upper end;
    connecting the lower end of the internal lead to the slide;
    storing the internal lead within the hollow interior of the of the shaft by sliding the slide toward the lower end of the shaft;
    extracting the internal lead from the hollow interior of the shaft by sliding the slide towards the upper end of the shaft;
    connecting a hook to the upper end of the internal lead;
    operatively positioning a locking mechanism in the hollow interior of the shaft;
    locking the slide in the retracted position using the locking mechanism.

17. The method of claim 16 further comprising the step of locking the slide in a retracted position by striking the lower end of the shaft on the ground when the upper end of the shaft is pointed upward.

18. The method of claim 16 further comprising the step of disengaging the slide from a locked position by striking the upper end of the shaft on the ground when the lower end of the shaft is pointed upward.

19. A fishing pole system comprising:
    a shaft extending a length between an upper end and a lower end;
    the shaft having a hollow interior;
    a point connected to the lower end of the shaft;
    a slide positioned within the hollow interior of the shaft;
    an internal lead connected to the slide;
    wherein the slide is configured to slide a length within the hollow interior of the shaft between a retracted position; and an extended position;
    wherein when in the extended position, the slide is positioned adjacent the upper end of the shaft;

wherein when in the retracted position, the slide is positioned adjacent the lower end of the shaft;

wherein when in the retracted position, the slide is engaged with a locking mechanism that selectively locks the slide in the retracted position, wherein when in the extended position, the slide is disengages from the locking mechanism that selectively locks the slide in the retracted position.

20. A fishing pole system comprising:

a shaft extending a length between an upper end and a lower end;

the shaft having a hollow interior;

a slide positioned within the hollow interior of the shaft;

an internal lead connected to the slide;

wherein the slide is configured to slide a length within the hollow interior of the shaft between a retracted position and an extended position;

wherein when in the extended position, the slide is positioned adjacent the upper end of the shaft;

wherein when in the retracted position, the slide is positioned adjacent the lower end of the shaft;

wherein when in the retracted position, the slide is engaged with a locking mechanism that selectively locks the slide in the retracted position;

wherein when in the extended position, the slide is disengaged from the locking mechanism that selectively locks the slide in the retracted position.

\* \* \* \* \*